United States Patent
Feldstein et al.

(10) Patent No.: US 7,383,203 B1
(45) Date of Patent: Jun. 3, 2008

(54) SYSTEM AND METHOD FOR DYNAMICALLY PROVIDING PERSONALIZED TRACKED DATA AND AUTOMATICALLY UPDATING THE DATA

(75) Inventors: Adam M. Feldstein, Seattle, WA (US); Scott W. Semyan, Seattle, WA (US); Mark E. Hickling, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/295,864

(22) Filed: Apr. 21, 1999

(51) Int. Cl.
*G06Q 30/00* (2006.01)
(52) U.S. Cl. .................................................. 705/14
(58) Field of Classification Search ................ 705/14
See application file for complete search history.

(56) References Cited

U.S. PATENT DOCUMENTS

| | | | | |
|---|---|---|---|---|
| 4,845,658 A | * | 7/1989 | Gifford | 709/217 |
| 5,432,904 A | * | 7/1995 | Wong | 705/4 |
| 5,485,370 A | * | 1/1996 | Moss et al. | 709/217 |
| 5,901,287 A | * | 5/1999 | Bull et al. | 709/218 |
| 5,931,878 A | * | 8/1999 | Chapin, Jr. | 701/30 |
| 5,940,847 A | * | 8/1999 | Fein et al. | 715/540 |
| 6,167,383 A | * | 12/2000 | Henson | 705/26 |
| 6,173,210 B1 | * | 1/2001 | Bjornson et al. | 700/99 |
| 6,177,931 B1 | * | 1/2001 | Alexander et al. | 725/52 |

FOREIGN PATENT DOCUMENTS

WO       WO98/53609      * 11/1998

OTHER PUBLICATIONS

Definition of "conflict", Merriam-Webster's Collegiate Dictionary accessed at http://www.search.eb.com/dictionary, Jul. 22, 2005.*
Definition of "correct" (vt), Merriam-Webster's Collegiate Dictionary, 10th ed. (Springfield MA: Merriam Webster), 1997.*
Trenchard, Barbara, "Typewriters that remember", Administrative Management v39n12, Dec. 1978: pp. 57, 58, 60 & 64.*

* cited by examiner

*Primary Examiner*—Donald L. Champagne
(74) *Attorney, Agent, or Firm*—Lyon & Harr, L.L.P.; Craig S. Fischer (57) ABSTRACT

The present invention is embodied in a system and method for enabling a user to quickly access personalized data specifically created and updated for the user with network tracking techniques. The tracking techniques provide quick and accurate location and updating of previously generated data associated with a particular user. New and updated data related to the previously generated data and specific to the particular user is regenerated so that the personalized data is automatically and dynamically updated in response to trackable remote user input. Also, portions of the data can be displayed as interactive data with client side processing. This allows real time interaction and manipulation of the personalized data values. Namely, the user can dynamically compute and generate personalized results from a remote location by interacting with displayed data.

19 Claims, 8 Drawing Sheets

SYSTEM AND METHOD FOR DYNAMICALLY PROVIDING PERSONALIZED TRACKED DATA AND AUTOMATICALLY UPDATING THE DATA

BACKGROUND OF THE INVENTION

1. Field of the Invention

The present invention relates to a system and method for processing data, and in particular, to a system and method for dynamically providing a user with personalized data based on user input and tracking the user input for providing data that is automatically updated in real time.

2. Related Art

Quick and easy interaction between a server and a client user is desirable, especially for systems with bandwidth limitations. For example, many networks, such as the Internet, utilize client-server systems. Many client users that utilize the Internet are subject to these bandwidth limitations. Bandwidth limitations limit the speed of Internet access, especially during server processing. Server processing is typically encountered every time the user makes a request during interaction with the World Wide Web. Constant server processing bogs down the server, delays user Internet navigation and creates an unpleasantly slow Internet experience for the user.

Typical server-client systems utilize servers that provide remote users with access to information stored on the server. For example, many servers have systems that provide access to stored database information. One such system is an automobile pricing database. In this system, after a user makes an initial request, the server provides results related to the request. However, if the user desires to modify, adjust, limit, etc. the results, the server typically must be re-accessed and a new request is submitted as a database query. As a result, the user is required to navigate sometimes through several layers of information. In addition, these systems do not provide efficient and automatic personalized updates of the data for each user. Without automatic personalized updates, users are not notified of updated personalized information and are required to re-enter data each time they desire specific data. Thus, these systems are slow, do not allow real time user interaction, require undue processing, and do not provide personalized information with data updating.

Therefore, what is needed is an effective and efficient technique for adjusting data values in real time in response to remote user input. What is further needed is a system and method that automatically provides personalized data and updates of the personalized data for each user.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a system and method for enabling a user to quickly access personalized data specifically created and updated for the user with network tracking techniques.

In general, one of the tracking techniques includes collecting and storing various types of user data and subsequently tracking the data for estimating results associated with the user and the data. The tracking techniques provide quick and accurate location and updating of previously generated data associated with a particular user. New and updated data related to the previously generated data and specific to the particular user is regenerated so that the personalized data is automatically and dynamically updated in response to trackable remote user input.

For example, the tracking techniques can be used with interactive environments, such as the Internet and the World Wide Web (WWW), for creating personalized WWW pages and for transmitting to the user automatically generated email relating to the tracked data. The WWW pages and users' email can be automatically updated with the tracked data and the estimated results.

In addition, the data can be mined, filtered or processed to derive user related data values, such as user characteristics, for creating unique user profiles and presenting the information in a personalized manner, such as with the personalized WWW page and personalized email. Moreover, direct target-marketing information can be created and produced from statistically formed conclusions, including creating user profiles, trends, tendencies, demographics etc. based on the user submitted information. However, information relating to the user is preferably kept confidential from external sources for protecting information relating to the users and for preserving their privacy rights. Also, the tracking techniques allow the direct target marketing without unduly subjecting the user to a marketing questionnaire.

Specifically, one tracking technique includes, first having a user request information from a remote computer by submitting data to a host. The host processes the data by generating a personalized set of results associated with the user's request and categorizing some or all of the data as trackable data for tracking purposes. The trackable data is utilized to automatically generate updated and new personalized results, which are available to each user. The results can comprise of sub-items and rules of enforcement of the results and the sub-items. For first-time users, original results can be transmitted from the host to the remote computer. For repeat users, certain updated results can be automatically transmitted from the host to the requesting remote computer, while other updated results are made available to the user at the user's request. As an example, this arrangement can be a personalized WWW page. Next, the results can be selected (results can be selectable with hypertext markup language [HTML] links), processed and manipulated in response to user interaction of the results and sub-item selection and configuration. Graphical user interface control devices can be used to allow user interaction and adjustment of the results. For example, alphanumerical boxes, drop-down menus, check boxes, radio buttons or the like can be used.

In addition, portions of the data can be displayed as interactive data for allowing real time interaction and manipulation of information, such as calculating projected repair costs, computing the projected price of a car and the like, in real time. The system and method of the present invention can utilize client side-processing of the results to accomplish this real time interaction. This enables the user to quickly access and adjust information dynamically and in real time without server delays.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout:

FIGS. 6–10 are sample user interfaces of the working example of FIG. 5 of the system and method of the present invention.

DETAILED DESCRIPTION OF THE INVENTION

In the following description of the invention, reference is made to the accompanying drawings, which form a part hereof, and in which is shown by way of illustration a specific example in which the invention may be practiced. It is to be understood that other embodiments may be utilized and structural changes may be made without departing from the scope of the present invention.

Introduction

Quick and easy interactive computer environments are very desirable, especially for remote users. In addition, personalized computer environments are very desirable. The present invention provides these types of interactive computer environments for remote users by generating personalized results, automatically updating the results and communicating the personalized results to the remote user, such as with personalized World Wide Web (WWW) pages, personalized email notification, automobile personal computers (auto PCs), pagers, and the like. The remote user can dynamically interact with the personalized results displayed on the WWW pages.

Namely, the system and method of the present invention allows the remote user to select or manipulate and view a set of personalized results produced by a host system in real time. In addition, some previous results can be stored and saved for the user and automatically updated for the convenience of repeat access.

Exemplary Operating Environment

Figure 1:
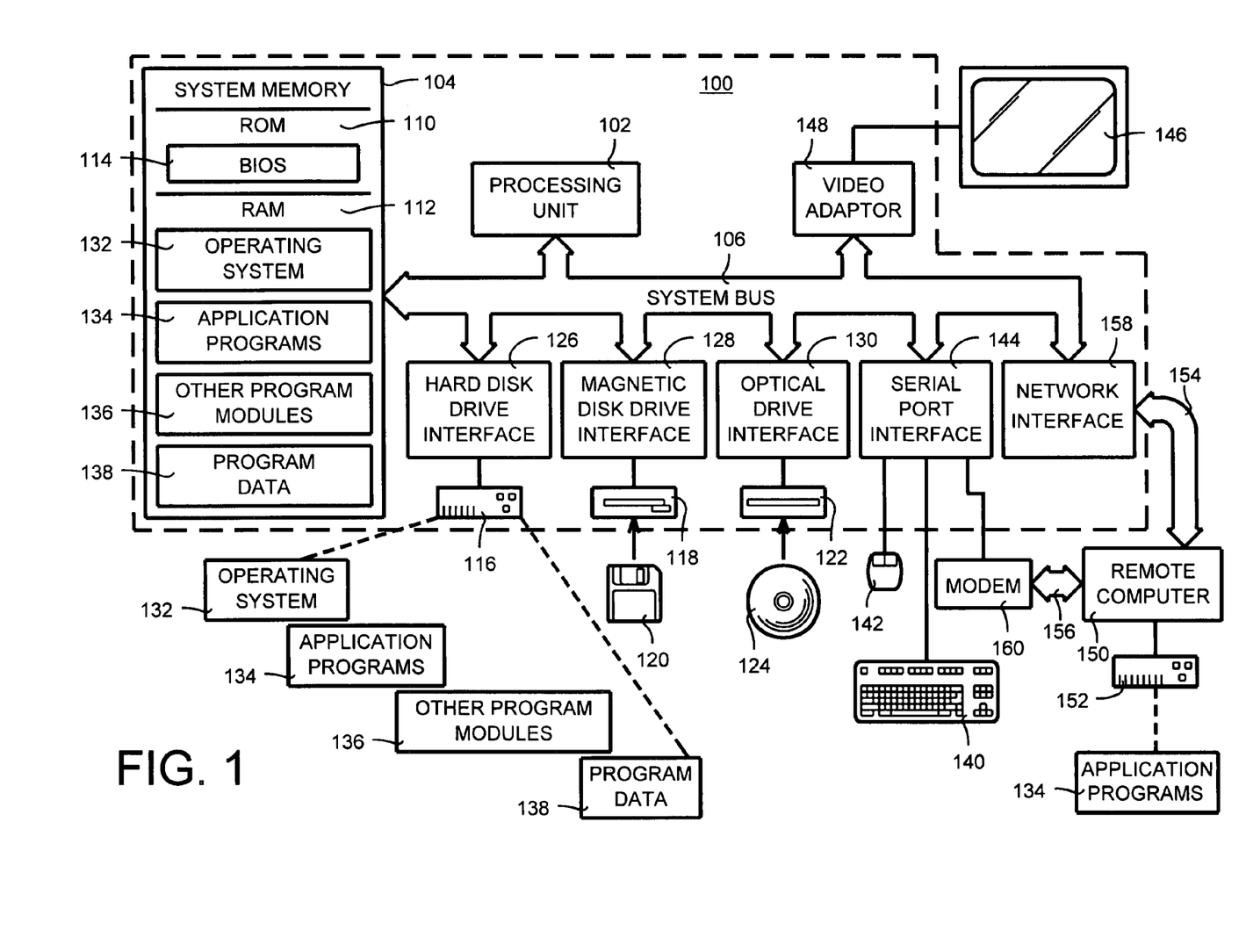
FIG. 1 is a block diagram illustrating an apparatus for carrying out the invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, mini-computers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general purpose computing device in the form of a conventional computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes computer storage media in the form of read only memory (ROM) 110 and random access memory (RAM) 112. A basic input/output system 114 (BIOS), containing the basic routines that helps to transfer information between elements within computer 100, such as during start-up, is stored in ROM 110. The computer 100 may include a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD ROM or other optical media. The hard disk drive 116, magnetic disk drive 128, and optical disk drive 122 are connected to the system bus 106 by a hard disk drive interface 126, a magnetic disk drive interface 128, and an optical drive interface 130, respectively. The drives and their associated computer-readable media provide storage of computer readable instructions, data structures, program modules and other data for the computer 100. Although the exemplary environment described herein employs a hard disk, a removable magnetic disk 120 and a removable optical disk 130, it should be appreciated by those skilled in the art that other types of computer readable media can store data that is accessible by a computer. Such computer readable media can be any available media that can be accessed by computer 100. By way of example, and not limitation, such computer readable media may comprise communication media and computer storage media. Communication media typically embodies computer readable instructions, data structures, program modules or other data in a modulated data signal such as a carrier wave or other transport mechanism and includes any information delivery media. The term "modulated data signal" means a signal that has one or more of its characteristics set of changed in such a manner as to encode information in the signal. By way of example, and not limitation, communication media includes wired media such as wired network or direct wired connection, and wireless media such as acoustic, RF, infrared and other wireless media. By way of example, and not limitation, communication media includes wired media such as a wired network or direct wired connection, and wireless media such as acoustic, RF, infrared and other wireless media. Computer storage media includes any method or technology for the storage of information such as computer readable instructions, data structures, program modules or other data. By way of example, such storage media includes RAM, ROM, EPROM, flash memory or other memory technology, CD-ROM, digital video disks (DVD) or other optical disk storage, magnetic cassettes, magnetic tape, magnetic disk storage or other magnetic storage devices, or any other medium which can be used to store the desired information and which can be accessed by computer 100. Combinations of any of the above should also be included within the scope of computer readable media.

A number of program modules may be stored on the hard disk, magnetic disk 120, optical disk 124, ROM 110 or RAM 112, including an operating system 132, one or more application programs 134, other program modules 136, and program data 138. A user may enter commands and information into the computer 100 through input devices such as a keyboard 140 and pointing device 142. Other input devices (not shown) may include a microphone, joystick, game pad, satellite dish, scanner, or the like. These and other input devices are often connected to the processing unit 102 through a serial port interface 144 that is coupled to the system bus 106, but may be connected by other interfaces, such as a parallel port, game port or a universal serial bus (USB). A monitor 146 or other type of display device is also connected to the system bus 106 via an interface, such as a video adapter 148. In addition to the monitor 146, computers may also include other peripheral output devices (not shown), such as speakers and printers.

The computer 100 may operate in a networked environment using logical connections to one or more remote computers, such as a remote computer 150. The remote computer 150 may be a personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and Internet.

When used in a LAN networking environment, the computer 100 is connected to the local network 154 through a network interface or adapter 158. When used in a WAN networking environment, the computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the computer 100, or portions thereof, may be stored in the remote memory storage device. It will be appreciated that the network connections shown are exemplary and other means of establishing a communications link between the computers may be used.

Figure 2:
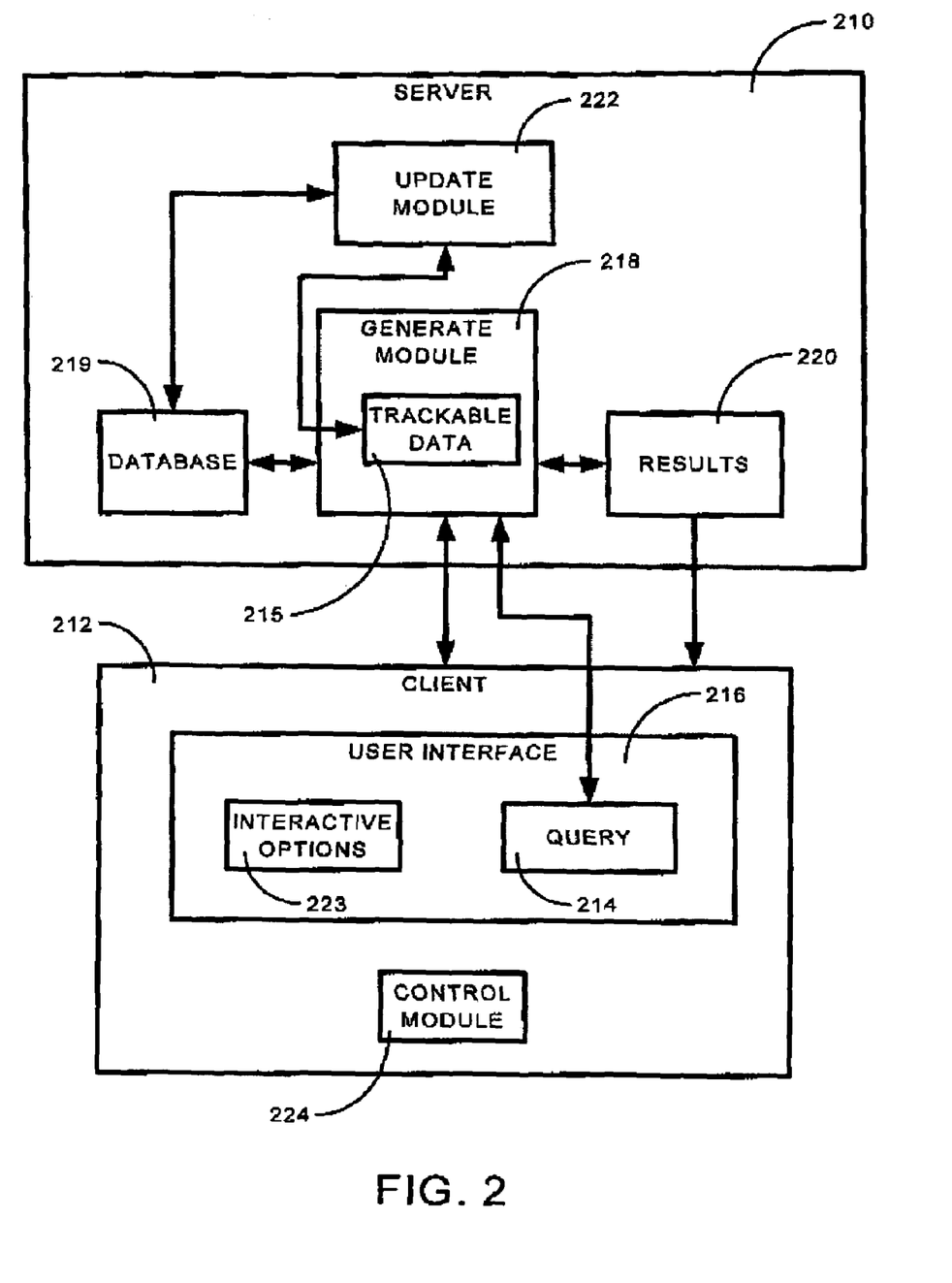
FIG. 2 is a block diagram illustrating an overview of the present invention.

Components and Operation:

FIG. 2 is a block diagram illustrating an overview of the present invention. The present invention is embodied in a system and method for providing real time interaction, including display and manipulation, of personalized data value results in response to remote user input. The system includes a host unit or server 210 coupled to at least one remote unit or client 212. A client query 214 is initiated by a user through a user interface (UI) 216, such as a graphical user interface (GUI). A generate module 218 receives the client query 214 and utilizes and categorizes an identifiable portion of the query 214 as trackable data 215. Also, the server preferably sends a marker, such as a "cookie" (a marker commonly used in HTML environments) to the client for associating the client machine with the query. The generate module 218 also accesses data of a database 219 and produces personalized results 220 comprised of data values specifically relating to the query 214. The results can also include sub-items and rules of enforcement of sub-item combinations. The data stored on the server 210 is accessed, preferably as sorted data.

An update module 222 coupled to the generate module 218 utilizes the trackable data 215 to quickly and accurately locate previously generated data associated with a particular user. With this information, the update module 222 accesses the database 219 and, if necessary, regenerates new and updated data specific to the particular user. Consequently, personalized data values are automatically and dynamically updated and displayed in response to a client query 214.

The results, sub-items, and rules of enforcement of sub-item combinations 220 are preferably sent in a single transmission to the client 212. The user interface 216 can display the personalized results and the sub-items as data values. The user at the client 212 is provided with interactive options 223 related to the personalized data values, which allows the user to interact with the data values and manipulate the data values with user input directed to the interactive options 223. Namely, the user can dynamically compute and generate personalized results from a remote location by interacting with displayed data. In addition, a control module 224 is preferably sent from the server to the client or created dynamically on the client 212, and is located on the client 212 during user interaction with the data values. The control module 224 provides real time user interactivity by controlling the transmitted results, sub-items and rules of enforcement and processing the user input for allowing dynamic manipulation of the data values and dynamic prevention of data value conflicts.

Figure 3:
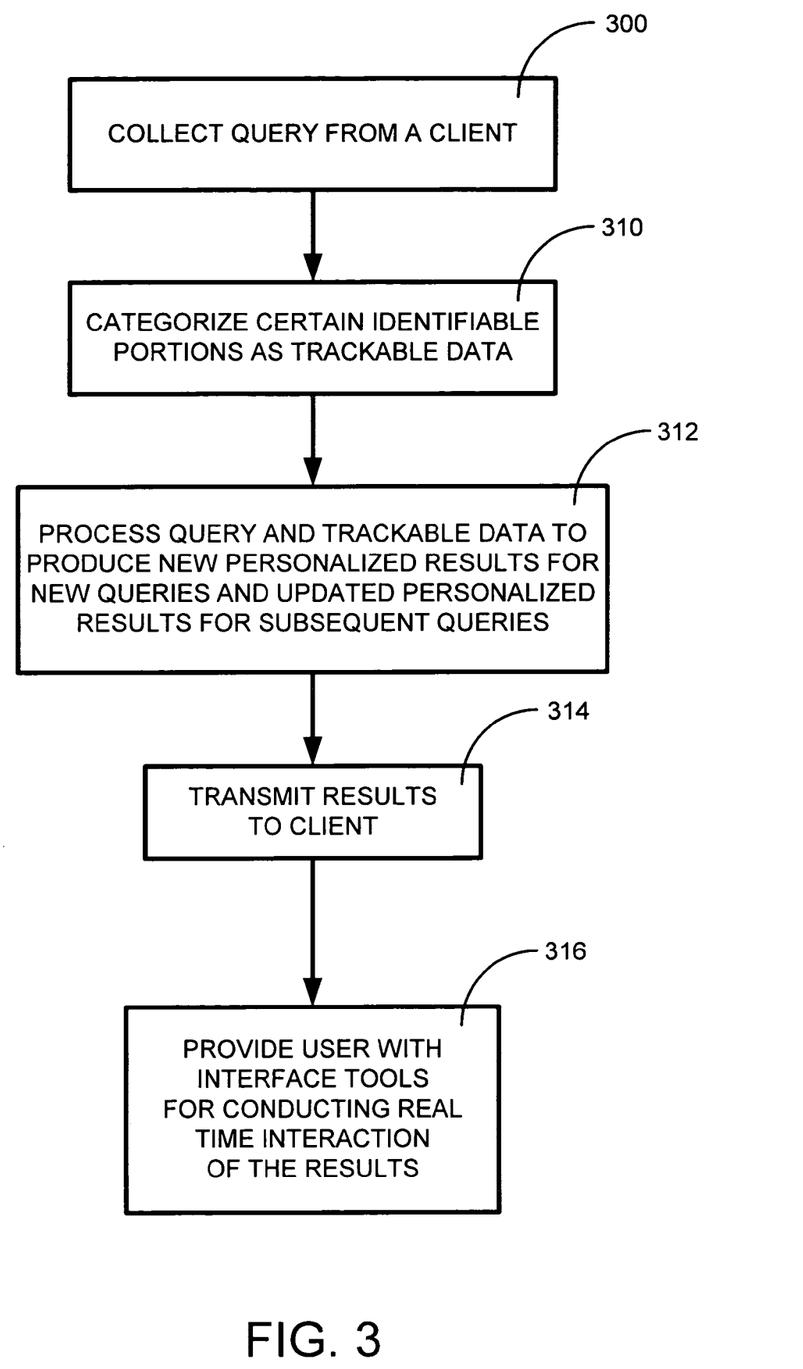
FIG. 3 is a flow diagram illustrating the general operational flow of the present invention.

FIG. 3 is a flow diagram illustrating the general operational flow of the present invention. Specifically, a host computer or server collects a query from a client computer or remote user (step 300) during a user registration process. The results can contain a marker or "cookie" (commonly used in HTML environments) for associating the request with the particular client computer or remote user. Certain identifiable portions of the query are categorized as trackable data (step 310). The query and trackable data are processed to produce new personalized results for new queries or updated personalized results for subsequent queries (step 312). The results and any associated sub-items or dependencies of the request are transmitted to the client from the server (step 314). The user is provided with real time interactivity of the results and associated dependencies with user input through interactive user interface tools (step 316), such as graphical user interface tools. Namely, the user can dynamically compute and generate personalized results from a remote location by interacting with displayed data.

The user input can be processed at the client to allow the real time interactivity in the form of manipulation, filtering and viewing of the results. FIGS. 2 and 3 refer to one server and one client for illustrative purposes only. It should be noted that the server referred to in FIGS. 2 and 3 can be one or more servers coupled to numerous respective clients and can communicate simultaneously with the clients in the manner described in FIGS. 2 and 3.

Figure 4:
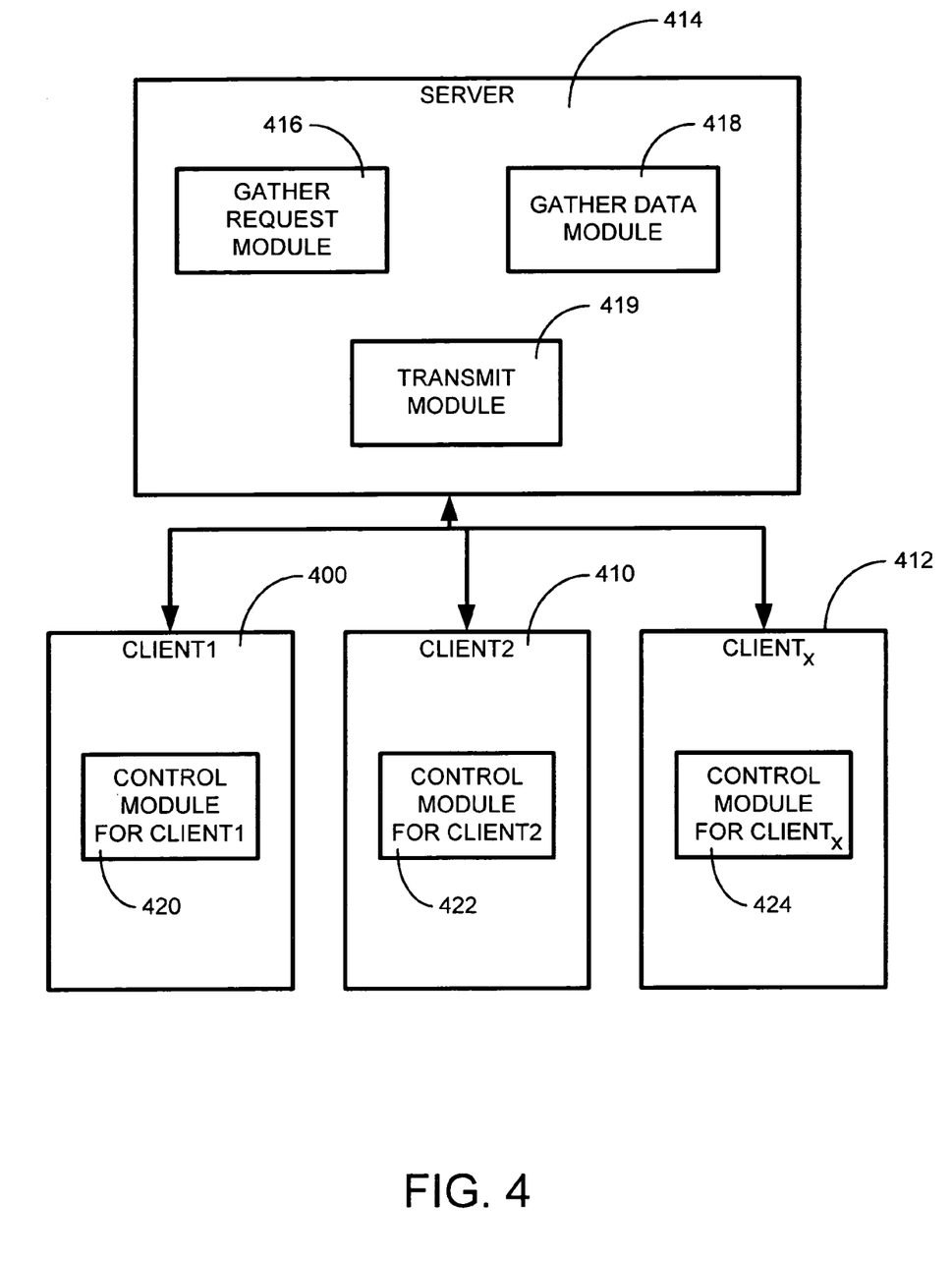
FIG. 4 is a block diagram illustrating a processing method in accordance with the present invention.

FIG. 4 is a block diagram illustrating a processing method in accordance with the present invention. For some actions, such as performing real time calculations and computations (for instance, dynamically calculating repair costs or computing automobile prices based on user interaction), the present invention can utilize client-side processing. Client-side processing involves performing data adjustment in response to user input on the client instead of on the server. Client-side processing provides a remote user with real time interactivity and dynamic data adjustment, unlike server-side processing, which forces the remote user to access the server every time the remote user adjusts the data.

For example, as shown in FIG. 4, client$_1$ 400 makes request$_1$ (R$_1$), client$_2$ 410 makes request$_2$ (R$_2$) and client$_x$ 412 makes request$_x$ (R$_x$). A server 414 utilizes a gather request module 416 for gathering and sorting respective results for each respective request. A gather data module 418 gathers and updates respective results, sub-items (dependencies) and sub-item rules of enforcement. A transmit module 419 transmits the data, sub-items, rules of enforcement of sub-item combinations and control module (CM$_1$, CM$_2$, CM$_x$) for each set of data. This information is sent to respective clients (Client$_1$, Client$_2$, Client$_x$) and respective users of the clients 400, 410, 412. The transmitted control modules 420, 422, 424 reside on each client. Each control module 420, 422, 424 also displays the respective data results for each respective client 400, 410, 412.

In addition, each user is provided with interactive options for manipulating the raw data results. For example, graphical user interface controls, such as user interface elements (UI elements), can be provided. The UI elements can include drop-down menus, alphanumerical input boxes, check boxes, radio buttons, sliders or the like. Since each control module resides on the client, they are able to process and display adjustments made by each user in real time, thereby providing a dynamic interactive environment.

The gather request module 416 and the gather data module 418 can utilize any suitable data retrieval technique, such as structured query language (SQL) techniques, to process the request and gather the data. The control module can be any suitable module for controlling operations and performing functions, such as an ActiveX control, Java applet, JavaScript, JScript, etc. Also, the control module can utilize any suitable data structure for organizing and adjusting the data in real time. For example, an array, stack and queue, linked list, decision tree, etc. can be used. In addition, the interactive options can be user friendly user interface devices, such as drop-down menus, alphanumerical input boxes, check boxes, radio buttons, sliders, etc. for adjusting the raw data results.

Figure 5:
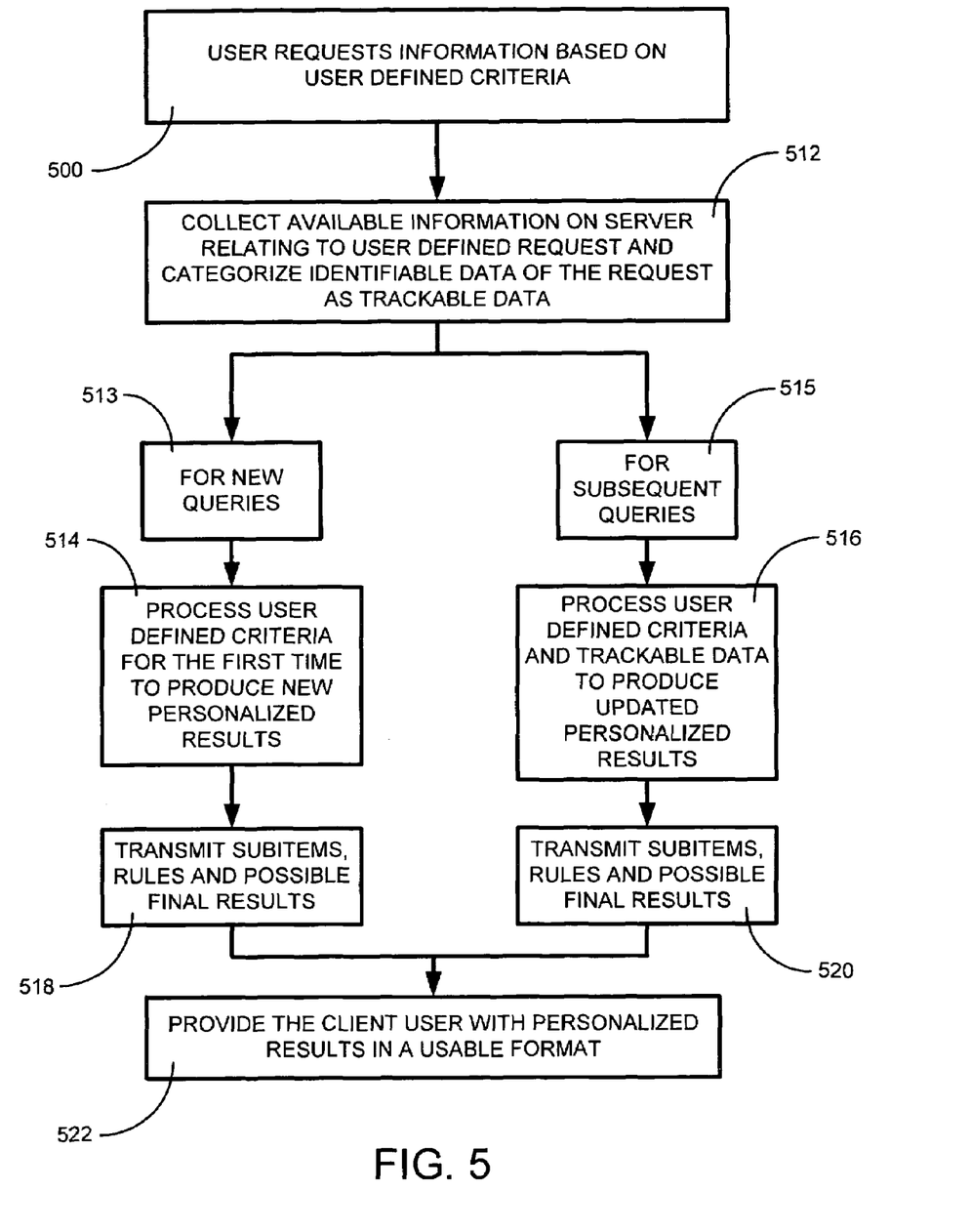
FIG. 5 is a flow diagram illustrating a working example of the system and method of the present invention.

Working Example:

FIG. 5 is a flow diagram illustrating a working example of the system and method of the present invention. FIGS. 6–10 are sample user interfaces of the working example of FIG. 5 of the system and method of the present invention. As discussed above, any suitable control component can be used. FIG. 5 is for illustrative purpose only and shows a working example utilizing a control, such as a script or a batch file utilizing JavaScript. The script or batch file can be written in any suitable scripting language, such as C++, Java, Visual Basic. The control component allows user manipulation of the results with graphical user interface development tools.

Overview

The present invention allows client users to register their automotive vehicles with an Internet server in order to create personalized auto WWW pages for the client users. Each personalized auto WWW page provides a high level of pertinent information on many aspects of automobile ownership and will link to sub-pages, which contain deeper levels of information.

Features of the Personalized Auto WWW Pages

The personalized auto WWW pages preferably contain maintenance schedules, auto recalls, interface controls for adding and removing vehicles, editing vehicle information, subscribing to email newsletters, determining reliable auto values such as Kelley Blue Book values. Automobile values can be automatically determined by having the user provide pertinent information, such as automobile options, mileage, condition, etc., relating to one of their pre-registered automobiles, as described in co-pending U.S. application Ser. No. 09/157,018, filed on Sep. 18, 1998 and entitled "A SYSTEM AND METHOD FOR DYNAMICALLY ADJUSTING DATA VALUES AND ENFORCING VALID COMBINATIONS OF THE DATA IN RESPONSE TO REMOTE USER INPUT" which is incorporated by reference herein.

The personalized auto WWW pages can also have WWW links, repair costs and auto diagnostics interface control tools, updated seasonal advice, special offers (a shopping zone having special insurance/finance offers, extended warranties, etc), consumer surveys, advanced yellow page links to selected automobile dealers and category specific Internet newsgroups, user tracking of maintenance items, local advertisements, vehicle reviews based on data collected from owner surveys, finance tracking, advice on selling ones own car (cost of maintenance, residuals, info from finance tracking), technical service bulletins, user upload of car photos for facilitating user classifieds advertisements, true tracking of oil change preferences and separate print pages for maintenance schedules.

User Registration with Queries

Users can request information about their own automobiles with a query and personalized results about their automobile can be automatically generated for the user. A short, 2-step WWW registration process is preferably used to collect all the information from the user necessary to start a personalized auto WWW page account on the server. The first step involves displaying a WWW page to the user that requests the user's vehicle information and location. The second involves displaying a WWW page to the user that requests the user's email address and allows the user to sign up for email alerts. In general, as shown in FIG. 5, first, the remote user requests information based on user defined criteria (box 500). The user defined criteria narrows the data results. For instance, the user defined criteria can be the manufacturer make and model of the specific automobile, their zip code, their automobile's current mileage, their projected driving mileage per year etc.

Consequently, the user defined criteria enables production of limited and targeted personalized results, such as pricing information, suggested maintenance costs and schedules, recall information etc. for a particular automobile. The user defined criteria can be obtained from the user in any suitable manner, such as the user interface of FIGS. 6–9. Next, the server collects the requested information relating to the user's defined request, stores it on the server, and categorizes identifiable data of the request as trackable data (box 512). For example, the identifiable data can be the user's zip code, the particular automobile's current mileage, and projected mileage usage per year.

Generation of Results:

For new queries and new creation of a personalized page of information 513, such as a personalized automobile page, the server makes an initial set of requests as user defined criteria for the client or remote user to answer as a query. The query preferably contains a marker for associating the query and personalized page of information with the particular client or remote user. The user defined criteria transmitted to the server for the first time is processed to produce new personalized results (box 514). The results can include associated sub-items or dependencies. For example, in one embodiment, such as an HTML user interface, the user is provided with an initial request and then subsequent related sub-requests, without changing screens or requiring navigation through different pages, as shown in FIGS. 6–9.

In general, based on the user's selection of a first request and first sub-request, subsequent sub-requests containing data subsets of previous requests can be dynamically configured and displayed on the user interface without requiring navigation through different pages. As an example, from a first subset of data and a second subset of data, limited data is available for configuration and display as a third subset of data. This process progressively narrows and refines the data and associated dependencies and can be used with numerous subsequent sub-requests containing associated subsets of data of previous sub-requests, as shown in FIGS. 6–9 and described in the example below. Also, any suitable order can be used to narrow the results.

Figure 6:
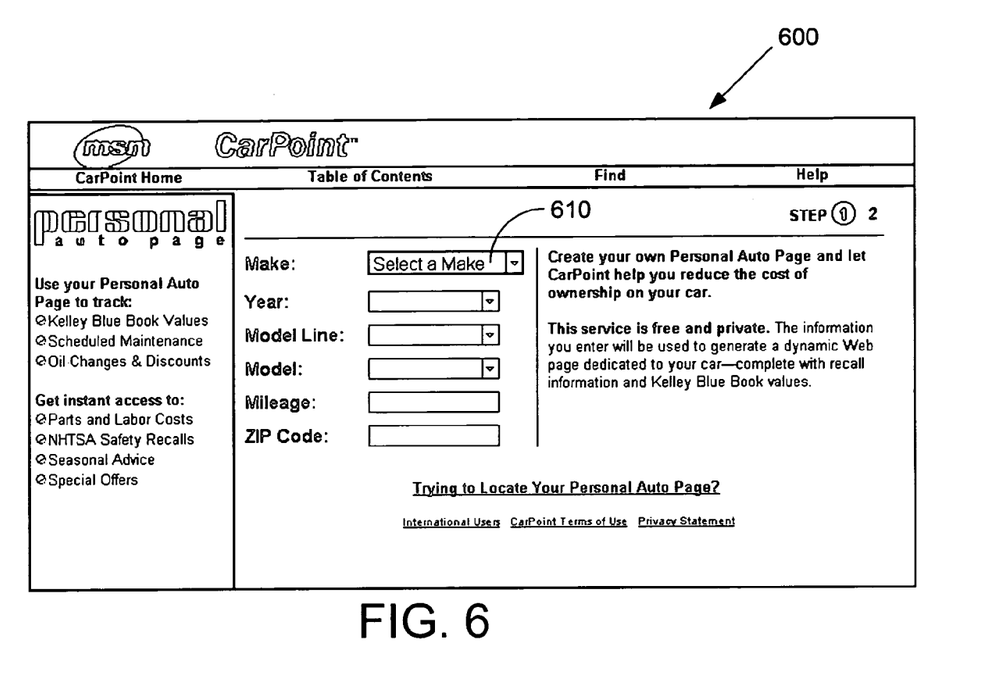

As an example, each subsequent sub-request is preferably directly associated with responses from the user to previous sub-requests. Subsequent sub-requests are dynamically configured as the user responds to previous sub-requests. For instance, as shown in FIG. 6, for a specific inquiry, the user is initially requested to select a first subset of data (such as a particular car make 610), from a general set of data (such as the set of all cars makes), from a user interface 600. The user interface can have any suitable interface tool such as a drop-down menu for presenting and accepting user input.

Based on the user's selection of the initial request, a new sub-request containing a second subset of data of the first subset is dynamically configured and displayed on the user interface without requiring navigation through different pages. In the example of FIGS. 6–9, the second subset of data contains limited information for the particular car make 610 chosen as the first subset.

Figure 7:
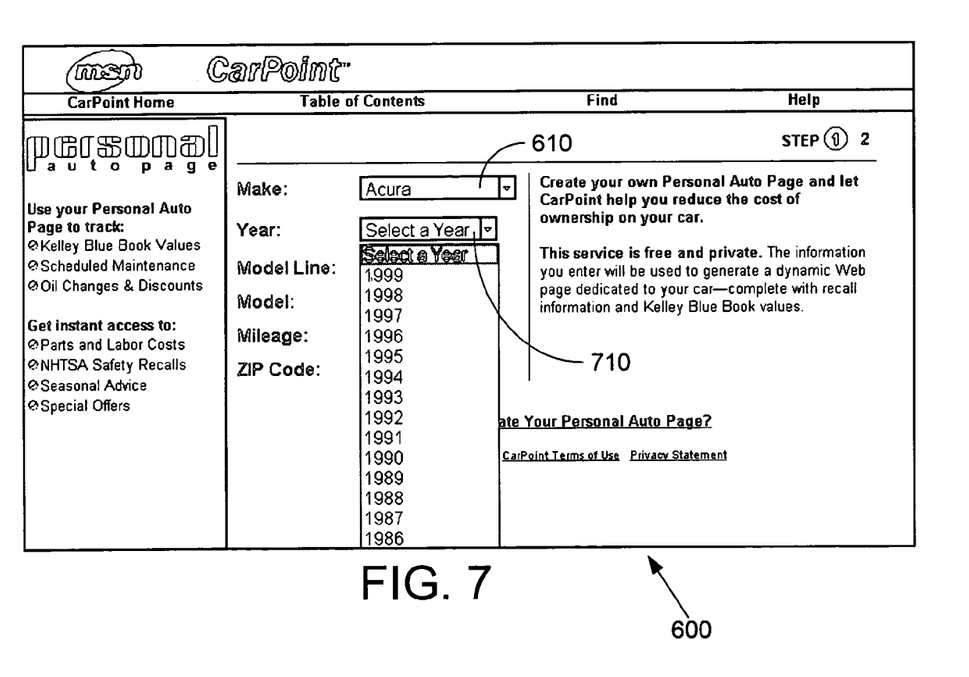

For example, only certain production years 710 are available for the particular car make 610 chosen, as shown in FIG. 7. The available production years are configured and displayed dynamically as the user submits the response (car make 610) to the first request. Similarly, only certain car models and model lines 810 are available for the particular car make 610 and production year 710 chosen, as shown in FIG. 8. The available car models and model lines 810 are configured and displayed dynamically as the user submits the response (production year 710) to the second request.

Further, the request of the initial query can include sub-requests allowing the server to collect specific identifiable information. For instance, as shown in FIG. 9, the identifiable information can include exact mileage 910 of the selected car, predicted mileage 916 driven during a year by the selected car and the zip code 920 of the selected car's location. The identifiable information, such as the exact mileage 910, predicted mileage 916 and zip code 920, can be categorized as trackable data and used for updating the personalized results, as discussed below.

For subsequent visits or user accesses 515, the personalized page of information is associated with the correct client (by using the query marker or "cookie" information), and the user defined criteria and the trackable data are processed to produce new and updated personalized results (box 516). Processing the trackable data includes accessing the user's personalized information on the server and automatically determining which other data on the server should be used to update and add new data to the current data of personalized information. After determining the appropriate data for updating the current data, a personalized data update is generated and incorporated into the user's personalized information located on the server. Any suitable database method can be used to generate the updated data and incorporate the updated data into the current data.

Transmission of Results:

The results can comprise of sub-items and rules of enforcement of the results and the sub-items. For first-time users, original results can be transmitted from the host to the remote computer immediately. For repeat users, certain updated results can be automatically transmitted from the host to the requesting remote computer, while other updated results can be made available to the user at his/her request.

Namely, for new queries, final results, associated sub-items or dependencies and logical rules of enforcement of sub-item combinations can be transmitted to the client user (box 518), in for example, HTML format. For subsequent queries, updated final results, associated updated sub-items or updated dependencies and updated logical rules of enforcement are transmitted (box 520). It should be noted that a sub-item could be a category, group or set of individual sub-items or simply individual sub-items that are a part or sub-set of a sub-item set. The data representing the final results, the updated final results, the sub-items, and the corresponding rules of enforcement are provided to the client in a usable format (box 522).

Figure 10:
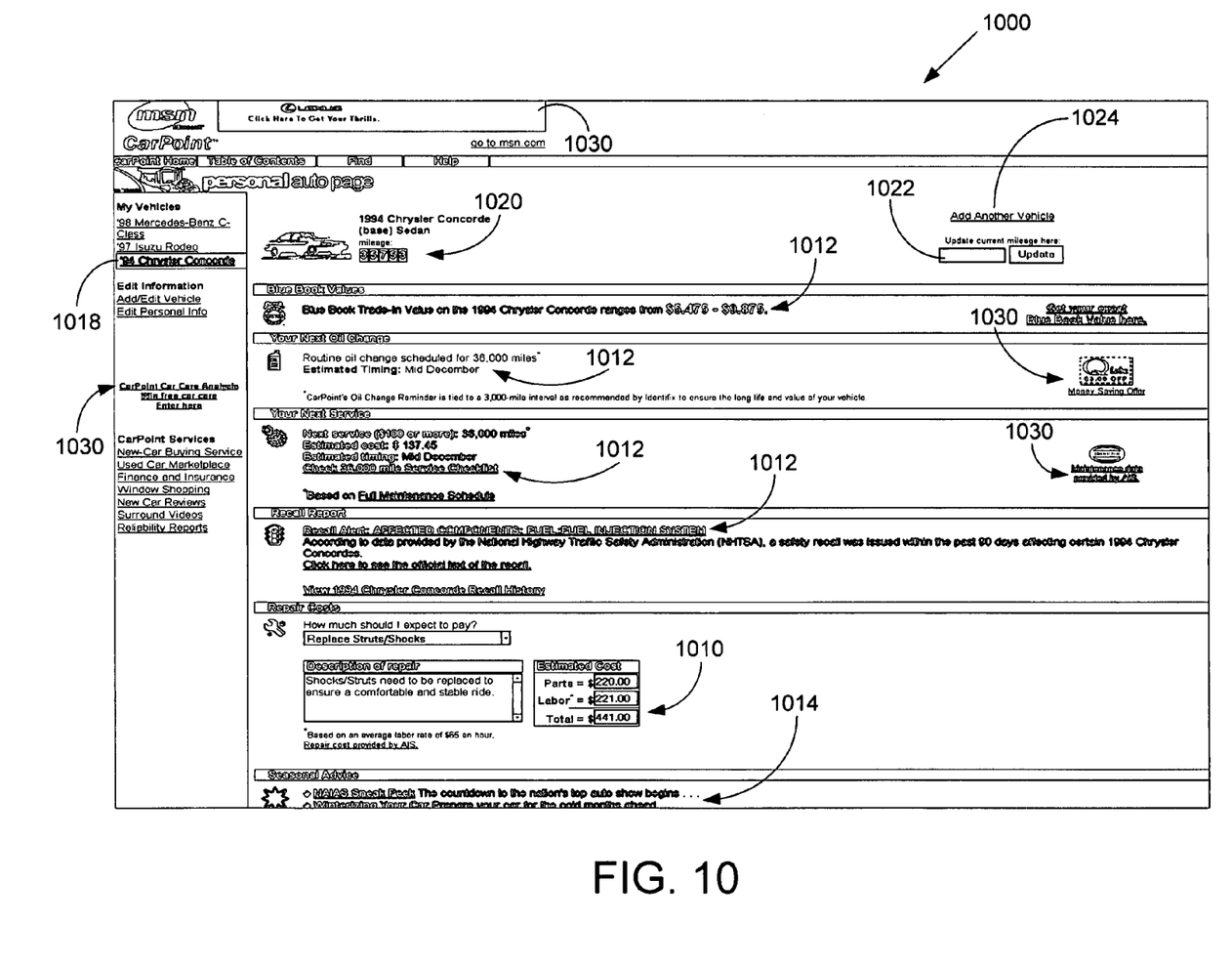

Display of Results:

The results and associated sub-items (dependencies) are displayed on the user interface 1000 of the client in a user readable format as shown in FIG. 10. The final results, the updated final results and the associated sub-items can be displayed in any suitable manner. The client user is provided with real time interactivity of the final results, the updated final results and the associated sub-items through interactive user interface tools, such as graphical user interface tools. The interface tools can include configurable input boxes that can accept alphanumerical input or the like, drop-down menus, check boxes, radio buttons or any suitable interface, such as graphical gauges that allow a user to move graphics within a reference datum for adjusting the criteria for associated fields in real time.

Namely, the user interface 1000 can include, among other things, manipulatable and update dependent results 1010, non-manipulatable and update dependent results 1012 and non-manipulatable and non-update dependent results 1014. Also, the user interface can include personalized navigational options 1018, personalized status information display 1020 and interactive options for manually revising portions of the identifiable data 1022 and performing additional queries 1024 to produce additional results. In addition, the user interface can include marketing displays 1030, such as direct marketing advertisements which can be non-manipulatable update or non-update dependent results.

For example, as shown in FIG. 10, the manipulateable and update dependent results 1010 can be an interactive repair calculator which computes typical repair costs for specified repairs of a particular car. Namely, the user can receive typical repair costs for a specified repair after selecting a specified repair. The typical repair costs are preferably dynamically computed and displayed as the user selects the specific repair. This result can be update dependent and appropriately updated depending on the trackable data. For instance, if the car mileage data was the trackable data, as the car mileage changed, the results could be updated by incorporating, into the current results, scheduled maintenance for the corresponding car mileage or any changes in the value of the car caused by mileage changes.

The non-manipulatable and update dependent results 1012 can be an area that periodically displays updated information specifically relating to the selected car, such as maintenance reminders, recent recall alerts, current value of the car, etc. The classified trackable data can be the date, mileage, zip code, and the like for updating the non-manipulatable and update dependent results 1012.

The non-manipulatable and non-update dependent results 1014 can be general advice or reviews about the car and are preferably not updated based on the trackable data, but can be updated based on other criteria, such as the current date. The personalized options 1018 can be a side navigational bar that allows the user to navigate between different areas of interest, such as other user configured cars with personalized information. The personalized status information display 1020 can be an area that displays current personalized general information, such as the current car being displayed, the car's actual or projected mileage, etc. The interactive options 1022 can be an input area for allowing the user to manually revise portions of the identifiable data 1022 and for allowing the user to add new personalized profiles 1024. For example, the current mileage of the car can be manually revised 1022 by the user and the user can also initiate new car profiles 1024 with personalized results.

The marketing displays 1030 can be banner advertisements, HTML links, electronic coupons, printable coupons, etc. The marketing displays 1030 can be directly related to the user's personalized profile. For example, if the user has a profile for a particular car, advertisements can be displayed for the same or similar car or class of car.

In addition, the marketing display 1030 can be related to the trackable data. Specifically, the data can be mined, filtered or processed to derive user related data values, such as user characteristics, for creating unique user profiles and presenting the information in a personalized manner, such as with the personalized WWW page and personalized email. Moreover, direct target-marketing information can be created and produced from statistically formed conclusions, including creating user profiles, trends, tendencies, demographics etc. based on the user submitted information. However, information relating to the user is preferably kept confidential from external sources for protecting information relating to the users and for preserving their privacy rights. Also, the tracking techniques allow the direct target marketing without unduly subjecting the user to a marketing questionnaire.

As an example, if the trackable data is the user's zip code, advertisements can be displayed for business in close proximity to the user's zip code. Also, if the trackable data is the mileage, advertisements for the sale of new cars can be displayed if the mileage is high. Likewise, advertisements for car maintenance can be displayed if a scheduled maintenance corresponding to the mileage is required.

Further, for certain results, the user is prevented from creating sub-item or dependency conflicts. The transmitted rules of enforcement (boxes 518 and 520) contain all potential configurable conflicts between sub-items and utilize a logic processor. The logic processor uses logic principles to prevent the user from creating sub-item combination conflicts and to resolve any potential conflicts during user adjustment of the sub-items. An example of this is if a user enters incorrect car mileage information, such as alpha-characters instead of numerical characters.

User Notification of Personalized Updates

As discussed above, mileage driven by the user can be tracked with actual updated and periodic input from the user and/or with estimated calculations based on some input from the user. For example, the latest mileage can be calculated by the following:

[(Today's Date)−(Last Date Mileage Changed)] in days×[(Miles/Days user drives)]+Last Entered Mileage=Current Estimated Mileage If mileage estimates are used, when the user returns to his/her personalized auto WWW page, the server preferably recalculates the estimate or can automatically update his/her mileage with the above calculated estimate. In order to keep the user informed that the mileage is only an estimate, a marker, such as an asterisk, is located after the mileage display and references a note. The referenced note of the asterisk informs the user that the current mileage is simply an estimate, and that he/she should update it with the actual mileage in order to get better blue book values and maintenance info.

Email Notification

Email notifiers are user requested, periodic emails which provide time sensitive information. The server preferably provides several email notifiers, including auto recalls and time sensitive maintenance information for the user's particular automobiles. The user may sign up for these in the initial registration, but if the user does not, the user will be provided other chances to do so in pertinent areas of the user's personalized auto WWW page. All emails preferably consist of a subject, body text and a footer that describes how to unsubscribe.

The maintenance email notifier will alert the user via email whenever a major service is due. These will generally be sent out no more often than 4–5 times a year. The oil change email notifier is a subset of the maintenance email notifier and will let the user know when it's time for an oil change, and provide the user with special related coupon offers as an added value. The server sends out email and maintenance notifiers when the actual or estimated mileage of an automobile matches recommended maintenance schedules. Additional user options can include allowing the user to set his/her own email notification options by enabling the user to select intervals of notification and last car mileage of the user's last oil change.

The maintenance schedules preferably focus primarily on the user's next service. The information provided about the next service preferably includes the name of the service, the mileage at which the next service is due, the approximate time the next service is due (described below), the projected package cost of the next service, a WWW link to the full list and price breakdown of the next service.

The user's next service is determined by taking the last entered or estimated mileage and finding the maintenance item on their vehicle's maintenance schedule with the next highest mileage. To determine when the next service is due, the server can use the following:

(Next Service Mileage)−(Current Mileage)/(Miles per day the user drives)=(Number of days until next service)

Also, since users' estimates of their auto usage are not likely to be totally accurate, exact dates are preferably not given when services are due. Thus, the following ranges are preferably displayed in the email:

| Day of Month | Time frame the email notifier displays |
|---|---|
| 1st–10th | early - <<month name>> |
| 11th–20th | mid - <<month name>> |
| 21st–31st | late <<month name>> |

For example, if the server determined a service to be due on the 21st of August, the server would display, "Next service in late August."

Moreover, user maintenance records, schedules and information can be tracked and stored on the users' personalized WWW pages. This allows accurate tracking of the maintenance history of users' cars. This information can be very valuable and can be used as a user's proof of properly maintaining the car when the user desires to sell his/her car or as a diagnostic aid (examining and analyzing prior maintenance history) when diagnosing difficult or latent problems.

In addition, a link, such as an HTML link can be incorporated in each user's WWW personal pages that automatically gathers at least a portion of the user's personalized information, formats the information, creates a classified page, and transfers the new classified page to an e-commerce classified advertisement section or an e-commerce automobile used car marketplace. This allows a user to automatically list his/her automobile with the previously created and tracked information from his/her personal WWW page as a classified advertisement by simply selecting a link or "mouse clicking" a user interface button. The information that is automatically gathered and formatted to create and transfer a classified advertisement can include contact information and pertinent automobile information previously provided by users to create their personalized automobile page, such as automobile make, model, year, options, mileage, maintenance history, photographs, etc.

With regard to recall information, the recall email notifiers are preferably sent to all owners of the recalled vehicle the day the server receives the recall notice from the National Highway Traffic Safety Administration (NHTSA). The server is preferably configured to receive this data weekly. As such, batch email transmissions can be used every week after immediate receipt of the NHTSA recalls, such as within 3 days.

User Modification of Registration Information

The present invention also includes an add/edit vehicle feature that allows the user to manipulate any registration information associated with any of the user's vehicles. This feature can be implemented by providing a first WWW page to the user that allows the user to select a car and an action, such as editing a vehicle's information (for instance, mileage, usage and the like) removing a vehicle, or adding a new vehicle.

Specifically, the add a new vehicle feature involves displaying a, WWW page that preferably behaves similar to the WWW registration page in that it requests new vehicle information from the user. The edit a vehicle feature utilizes a WWW page similar to the add a new vehicle WWW page. However, this WWW page can display data for the vehicle being edited with pre-filled information. For example, the year, make, model line and model are preferably not displayed in dropdown menus, rather they are preferably in plain text, and not editable. The user will also be able to select their primary/default vehicle here by clicking a checkbox. The vehicle entered in registration is initially the default vehicle.

The remove a vehicle feature can utilize alerts, such as JavaScript alerts, asking whether the user really wants to delete that vehicle and lose all the data entered for it. If the user selects yes, the vehicle is removed from the server's database, and the add/edit WWW page is refreshed with the new list of current vehicles. If the user says no, the dialog is dismissed and nothing happens.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for displaying custom and personalized information on a client system operating in a network, comprising:
   collecting data associated with a user;
   processing the data to extract user characteristics to create unique user profiles and generate personalized information;
   tracking at least a portion of the data and performing estimation calculations using client-side processing to generate results and updated personalized information;
   adjusting the results dynamically on the client by a user's interaction with the results;
   preventing the user from encountering sub-item or dependency conflicts for both data entered into the client by the user, and for data received from the network by the client, by using client-side processing to automatically prevent the conflicts from being displayed during the user's interaction with the results, wherein a set of rules of enforcement is transmitted to said client and used as the basis for said processing, wherein said rules contain all potential configurable conflicts between sub-items that may occur during the user's interaction and corresponding safeguards to prevent the user from encountering and viewing a conflict during the user's interaction with the results, wherein preventing further comprises not offering sub-items unrelated to requested data and automatically selecting other sub-items as a particular conflicting sub-item is requested by the user; and
   automatically communicating the results and the personalized and updated information to the user via the client.

2. The method of claim 1, wherein the client system is an interactive computer environment.

3. The method of claim 2, wherein a server and client communicate over the World Wide Web of the Internet.

4. The method of claim 3, wherein the server and client are operable in an HTML environment.

5. The method of claim 1, further comprising providing interface options for allowing adjustment and filtering of the personalized information and results in response to user input.

6. The method of claim 5, wherein the adjustable interface options are interactive graphical controls.

7. The method of claim 1, wherein the user characteristics include at least one of user profiles, trends, tendencies and demographics.

8. The method of claim 1, wherein the results and personalized and updated information are transmitted to the client and displayed on a World Wide Web page on the Internet and in personalized email.

9. The method of claim 1, wherein portions of the data are displayed as interactive data for allowing real time interaction and manipulation of information.

10. The method of claim 9, wherein the interactive data is used for calculating projected automobile repair costs and computing projected prices of automobiles in real time on the client.

11. The method of claim 10, wherein client-side processing of the results is used to enable the real time interactivity.

12. A computer-readable medium having computer-executable instructions for displaying custom and personalized information on a client system operating in a network, comprising:

using the client system to collect personal data associated with a user;

receiving on the client system a set of rules of enforcement that contains all potential configurable conflicts between sub-items;

processing the personal data to formulate a classification profile for the user and postulating buying trends and tendencies of the user in order to create personalized information;

tracking at least a portion of the personal data and performing estimation calculations using processing on the client system to generate results relating to the classification profile and updating the personalized information; and providing the user with real-time interactivity to dynamically adjust the results on the client system;

preventing the user from creating, encountering, and viewing conflicts between sub-items for both data entered into the client system by the user, and for data received from the network by the client system, during the real-time interactivity by using client-side processing to automatically prevent the conflicts using the set of received rules of enforcement, wherein preventing further comprises not offering sub-items unrelated to requested data and automatically selecting other sub-items as a particular conflicting sub-item is requested by the user; and automatically communicating the results and the personalized and updated information to the user on a World Wide Web page on the Internet and in personalized email.

13. The computer-readable medium of claim 12, wherein a server and client are operable in an HTML environment.

14. The computer-readable medium of claim 12, further comprising providing interface options to allow adjustment and filtering of the personalized information and results in response to user input.

15. The computer-readable medium of claim 12, wherein portions of the data are displayed as interactive data to allow real time interaction and manipulation of information.

16. The computer-readable medium of claim 15, wherein the interactive data is used to calculate projected automobile repair costs and computing projected prices of automobiles in real time on the client.

17. The computer-readable medium of claim 12, wherein the classification profile is used to demographically and statistically generate information for performing direct target marketing.

18. The computer-readable medium of claim 12, wherein the personal data includes automobile mileage data that is tracked for estimating maintenance schedules.

19. A method for adjusting personalized results containing personalized data about a remote user, comprising:

collecting a query from the remote user using a client computer operating in a network;

categorizing at least a portion of the query as trackable data;

processing the query and trackable data to produce the personalized results;

displaying the personalized results;

providing the remote user with real-time interaction with the personalized results for dynamic adjustment of the personalized results using processing on the client computer; and preventing the remote user from encountering sub-item or dependency conflicts for both data entered into the client computer by the user, and for data received from the network by the client computer, by using processing on the client computer to automatically prevent any conflicts such that conflicts are not displayed during the remote user interaction, wherein a set of rules of enforcement is transmitted to the client computer and used as the basis for said processing, wherein said rules contain all potential configurable conflicts between sub-items that may occur during the remote user interaction and corresponding safeguards to prevent the remote user from encountering and viewing a conflict during the remote user interaction, and wherein preventing further comprises not offering sub-items unrelated to requested data and automatically selecting other sub-items as a particular conflicting sub-item is requested by the remote user.

* * * * *